(12) United States Patent
Breton et al.

(10) Patent No.: US 8,398,181 B2
(45) Date of Patent: Mar. 19, 2013

(54) ENDLESS ELASTOMERIC TRACK

(75) Inventors: Rémi Breton, Drummondville (CA); Danny Roy, Drummondville (CA); François Duquette, Drummondville (CA)

(73) Assignee: Soucy International Inc., Drummondville (CA)

( * ) Notice: Subject to any disclaimer, the term of this patent is extended or adjusted under 35 U.S.C. 154(b) by 146 days.

(21) Appl. No.: 12/444,457

(22) PCT Filed: Oct. 5, 2007

(86) PCT No.: PCT/CA2007/002379
§ 371 (c)(1),
(2), (4) Date: May 22, 2009

(87) PCT Pub. No.: WO2008/071011
PCT Pub. Date: Jun. 19, 2008

(65) Prior Publication Data
US 2010/0096914 A1    Apr. 22, 2010

(30) Foreign Application Priority Data
Oct. 6, 2006 (CA) ...................................... 2562995

(51) Int. Cl.
*B62D 55/24* (2006.01)
(52) U.S. Cl. ........................................ 305/165; 305/174
(58) Field of Classification Search .................. 305/157, 305/165, 173, 174, 167, 177
See application file for complete search history.

(56) References Cited

U.S. PATENT DOCUMENTS

| 3,722,961 | A | | 3/1973 | Haley et al. |
| 4,904,030 | A | * | 2/1990 | Ono ............................. 305/174 |
| 5,295,741 | A | | 3/1994 | Togashi et al. |
| 5,447,365 | A | | 9/1995 | Muramatsu et al. |
| 6,471,307 | B2 | * | 10/2002 | Watanabe et al. ............. 305/193 |
| 6,869,153 | B2 | * | 3/2005 | Wright et al. ................. 305/169 |
| 6,923,515 | B2 | | 8/2005 | Konickson et al. |
| 2004/0164613 | A1 | | 8/2004 | Konickson et al. |

FOREIGN PATENT DOCUMENTS

| DE | 29818131 U1 | | 1/1999 |
| JP | 06255546 A | * | 9/1994 |
| JP | 10/007038 A | | 1/1998 |
| JP | 2000-095158 | | 4/2000 |

OTHER PUBLICATIONS

ISR of PCT/CA2007/002379.
WO of PCT/CA2007/002379.

* cited by examiner

*Primary Examiner* — Kip T Kotter
(74) *Attorney, Agent, or Firm* — Brouillette & Partners; François Cartier; Robert Brouillette

(57) ABSTRACT

This invention generally relates to the configuration of the inner surface of a traction band which increases the protection of the embedded reinforcing elements without reducing the flexibility of the band or increasing the generation of heat. The outer surface of the band generally comprises a plurality traction lugs while the inner surface generally comprises a plurality of drive and/or guide lugs. According to the present invention, each group of traction lugs, drive lugs and guide lugs, which are generally laterally aligned, defines generally non-flexible lug areas and each of these lug areas are separated by flexible and generally lug-less hinge areas. The lug areas, on the inner surface thereof, further comprise projections located between the drive lugs and the guide lugs and along the wheel paths defined therebetween.

6 Claims, 7 Drawing Sheets

ENDLESS ELASTOMERIC TRACK

CROSS-REFERENCE TO RELATED APPLICATIONS

The present patent application claims the benefits of priority of commonly assigned Canadian Patent Application No. 2,562,995, filed at the Canadian Intellectual Property Office on Oct. 6, 2006.

FIELD OF THE INVENTION

The present invention generally relates to tracked vehicles which use endless tracks for propulsion. More particularly, the present invention relates to the endless tracks used on such tracked vehicles. Without being limitative in nature, the present invention particularly relates to endless tracks for use on heavy tracked vehicles such as military vehicles (e.g. tanks and transport vehicles) and heavy machinery (e.g. excavators, bulldozers, forestry equipments).

BACKGROUND OF THE INVENTION

Conventionally, a military vehicle comprises a set of five or six road wheels on each side thereof over which a track or traction band runs. The suspension of each wheel is preferably independent. Along with the set of road wheels, the track system also comprises a sprocket wheel and an idler wheel, each of which is located at each end of the vehicle and is preferably located above the ground. More recently, tracked military vehicles, and other heavy tracked vehicles, have begun to use endless tracks made of rubber and/or other elastomeric material instead of metallic tracks.

In these recent track systems, the track generally comprises an outer surface comprising traction lugs and an inner surface comprising drive lugs and/or guide lugs (also referred to as guide horns). In these types of track, the drive lugs and the guide lugs, which are generally laterally spaced apart, generally define two or more wheel paths into which the road wheels are adapted to roll. In the majority of tracks, the wheel paths are generally flat and continuous in order to avoid undesirable vibrations.

Overtime, it has been discovered that the rubber of these tracks had a tendency to delaminate, particularly over the reinforcing elements embedded into the track rubber body and which are generally aligned with the lugs.

A general prior art solution for preventing delamination was to increase the overall thickness of the track. Yet, if this solution was possible for small or relatively thin tracks (e.g. snowmobile rubber tracks), for larger tracks, it is not appropriate.

As a matter of fact, large traction bands used on large and/or heavy vehicles are generally already at their maximum possible thickness. Any overall increase of thick would bring unwanted results.

Indeed, when rubber and/or elastomeric material bend, the bending of the material generates heat. On small tracks, the heat generation is relatively low and easily dissipated due to the small volume to surface ratio. However, on larger tracks, the heat generation is substantially high and less easily dissipated due to the higher volume to surface ratio. Moreover, since the hinge portions or areas of large tracks used on heavy vehicles are generally already at their maximum possible thickness, any addition of material at the hinge areas would most probably fatally increase the heat generation above the threshold above which failure of the material are likely to occur, thereby creating other problems.

Despite that the hinge areas are already at their maximum thickness, there is still a need to improve the durability and/or resistance to wear of rubber and/or elastomeric tracks that are preferably but not exclusively used on heavy vehicles.

OBJECTS OF THE INVENTION

Accordingly, an aspect of the present invention is to provide an endless track for used on tracked vehicles which provides increased durability without hindering the flexibility of its hinge areas.

Another aspect of the present invention is to provide an endless track which increases the protection of the track reinforcing elements over the wheel path in the lugs areas.

Still another aspect of the present invention is to provide an endless track which generally does not substantially increase the level of vibration.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

Accordingly, the present invention consists of an endless track made of rubber [NOTE: As used hereinabove and hereinafter, the term "rubber" relates to any elastic and primarily non metallic materials such as rubber, elastomers, or other polymers and/or combinations thereof used in the manufacture of endless tracks]. The track comprises an outer surface onto which are disposed traction lugs for providing traction to the vehicle. The track also comprises an inner surface, itself comprising at least outwardly projecting drive lugs adapted to mate with a sprocket wheel and preferably further comprising guide lugs or horns adapted to guide the track over the road, idler and sprocket wheels of the vehicle. In order to provide a space for the wheels, the drive lugs and guide lugs are preferably laterally spaced apart along the width of the track. The spaces between the drive lugs and guide lugs define the wheel paths into which the wheels can travel.

According to an aspect of the invention, the drive lugs, guide lugs and traction lugs are preferably laterally aligned into generally non-flexible lug areas. Consecutive lug areas are separated by flexible hinge areas. The hinge areas allow the track to bend as it rotates around the wheels of the vehicle.

In order to provide enhanced durability of the track while not hindering its flexibility, the lug areas of the track of the present invention are further provided with projections on their inner surface located between the drive and guide lugs and along the wheel paths defined thereby. Consequently, the projections increase the thickness of the lug areas and more particularly along the wheel paths thereof, thereby further protecting the reinforcing elements embedded into the track.

Yet, the hinge areas are not provided with such projections and therefore the thickness of the hinge areas is not increased.

The track of the present invention understandably provides discontinuous wheel paths. Even though it might be believed that the track of the present invention would increase the noise level and/or the vibration level of the track, it is generally not so. In fact, in the present invention, the projections are dimensioned such that when they interact with large diameter wheels, only a small though generally insignificant increase of the sinusoidal movement is detected. Indeed, because of their configuration and dimension, the projections allow the road wheel to cross from a lug area to the next without rolling in the hinge area as in some prior art tracks, resulting in only minimal deformation of the track between consecutive lug areas. This results in wheel paths having a generally increased thickness over the embedded reinforcing components, giving them an increased protection from the environment. Moreover, the resulting rise in noise and vibration is negligible when compared to a conventionally continuous wheel path and the more so in the context of heavy tracked machinery.

BRIEF DESCRIPTION OF THE DRAWINGS

The invention may be best understood by reference to the following detailed description and considered in connection with the accompanying drawings wherein.

DETAILED DESCRIPTION OF THE PREFERRED EMBODIMENT

Figure 1:
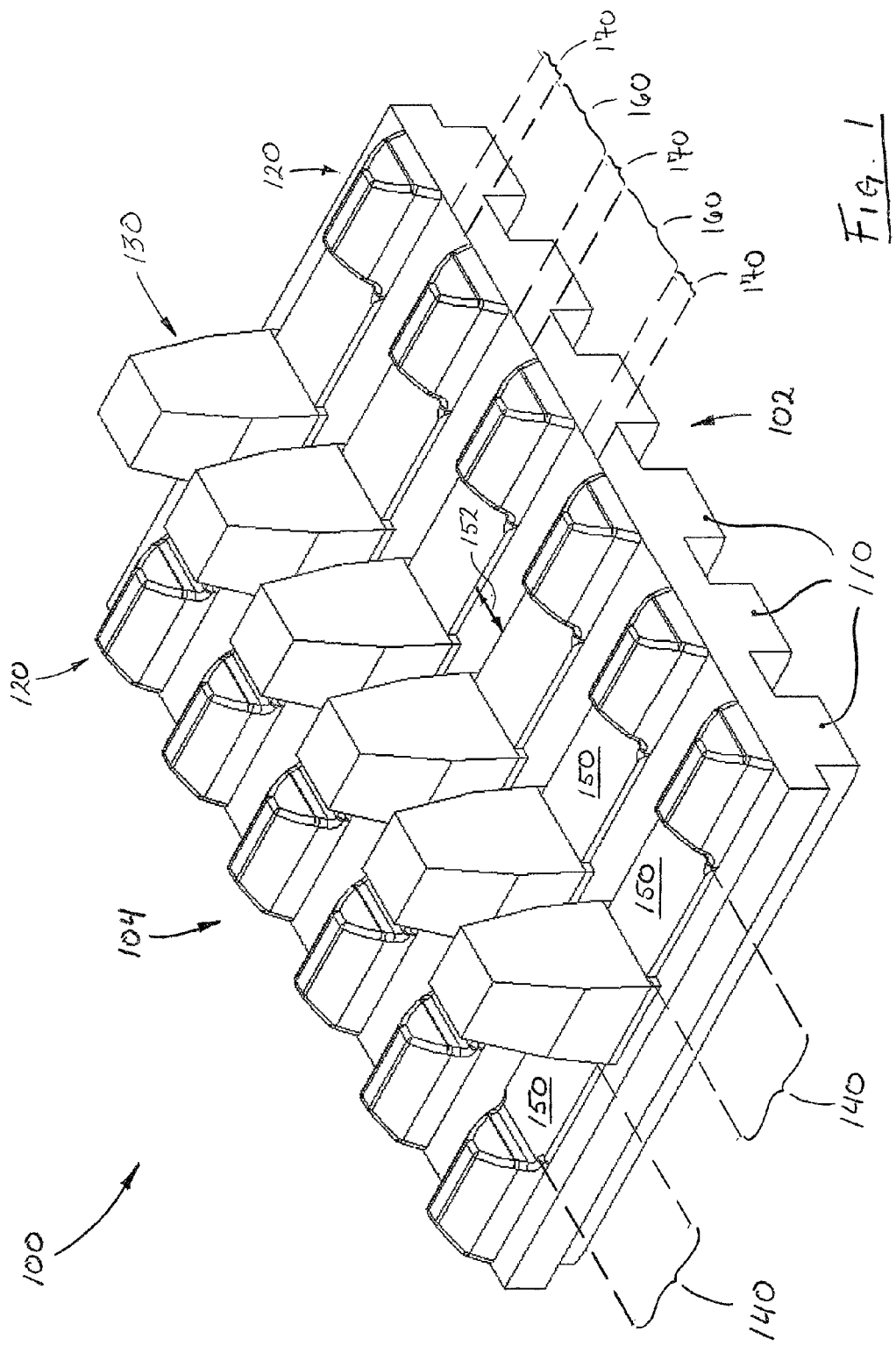
FIG. 1 is a perspective view of the inner surface of a track according to an embodiment of the present invention.

As can be seen in FIG. 1, the track 100 of the present invention, which is preferably made of rubber and/or elastomeric material, comprises a plurality of preferably substantially non-flexible lug areas 160 separated by flexible hinge areas 170. Understandably, the track 100 comprises an outer ground engaging surface 102 and an inner wheels engaging surface 104.

The hinge areas 170 of the track are designed and dimensioned to be flexible enough to provide flexion between consecutive lug areas 160 yet thin enough not to generate excessive heat after numerous flexion. As it is known, excessive heat generated by successive flexions and extensions of the hinge areas 170 can have a deleterious effect to the track 100 and to the rubber thereof. Accordingly, in order to prevent the generation of excessive heat, the hinge areas 170 of the present track 100 are generally limited in their thickness.

The lug areas 160 of the track 100 are provided, on their outer surface 102, with traction or terrain lugs 110. These traction lugs 110 are generally designed to provide friction between the ground and the track 100, thereby providing traction to the vehicle (not shown). Traction lugs 110 of different shape could be used according to the terrain upon which the track is intended to be used. The present invention is not limited to any types of traction lugs 110.

The inner surface 104 of the lug areas 160 are provided, in the preferred embodiment, with drive lugs 120, adapted to matingly cooperate with a sprocket wheel (not shown), and with at least one guide lug 130, adapted to guide the road wheels of the vehicle. As best shown in FIG. 1, the drives lugs 120 and the guide lug 130 are laterally spaced apart in order to define paths 140 for the road wheels 200 of the vehicle.

Figure 2:
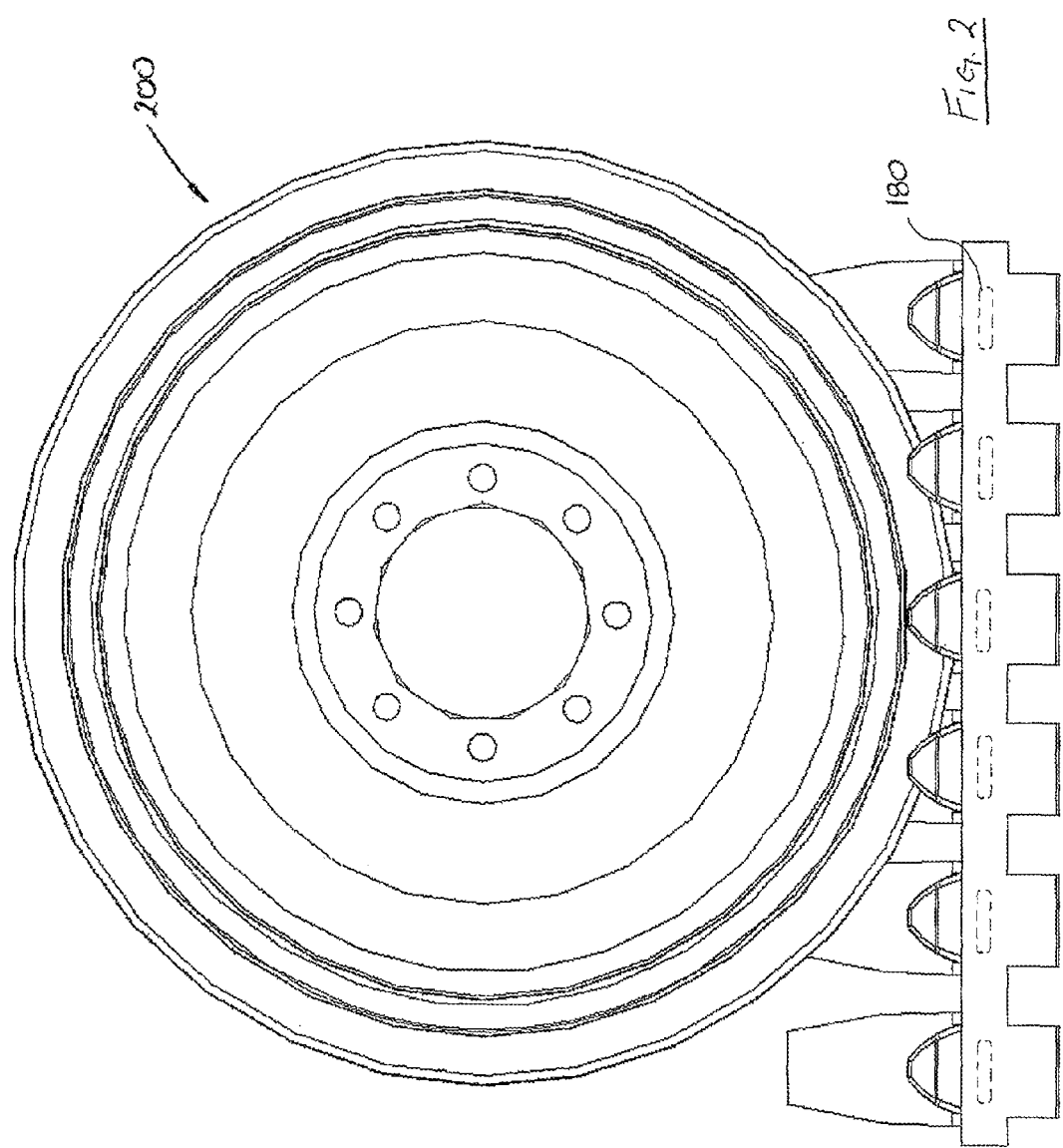
FIG. 2 is a side view of the track of FIG. 1 with a road wheel over a lug area.
Figure 3:
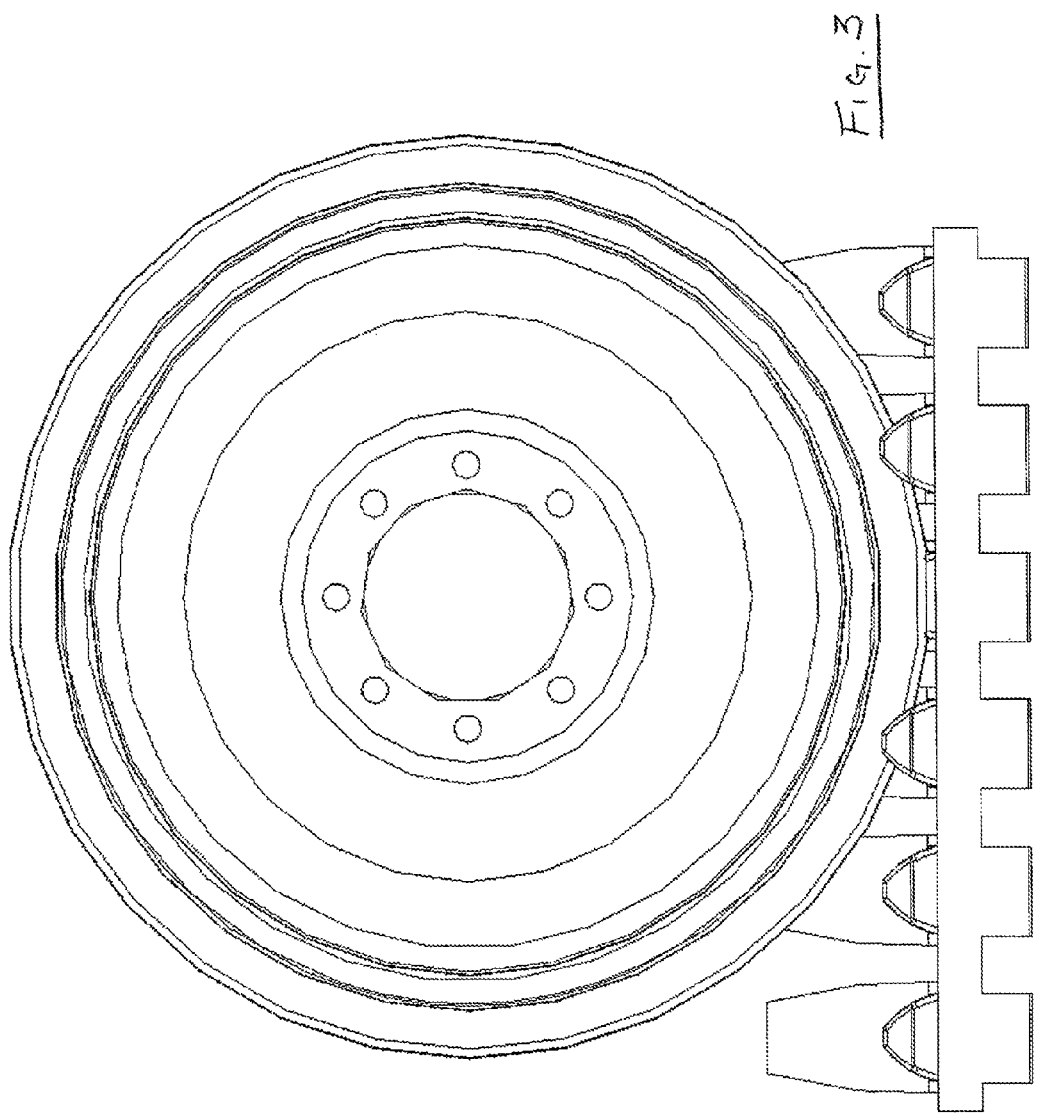
FIG. 3 is a side view of the track shown in FIG. 2 with the road wheel over a lug area and with a drive lug removed for clarity.
Figure 4:
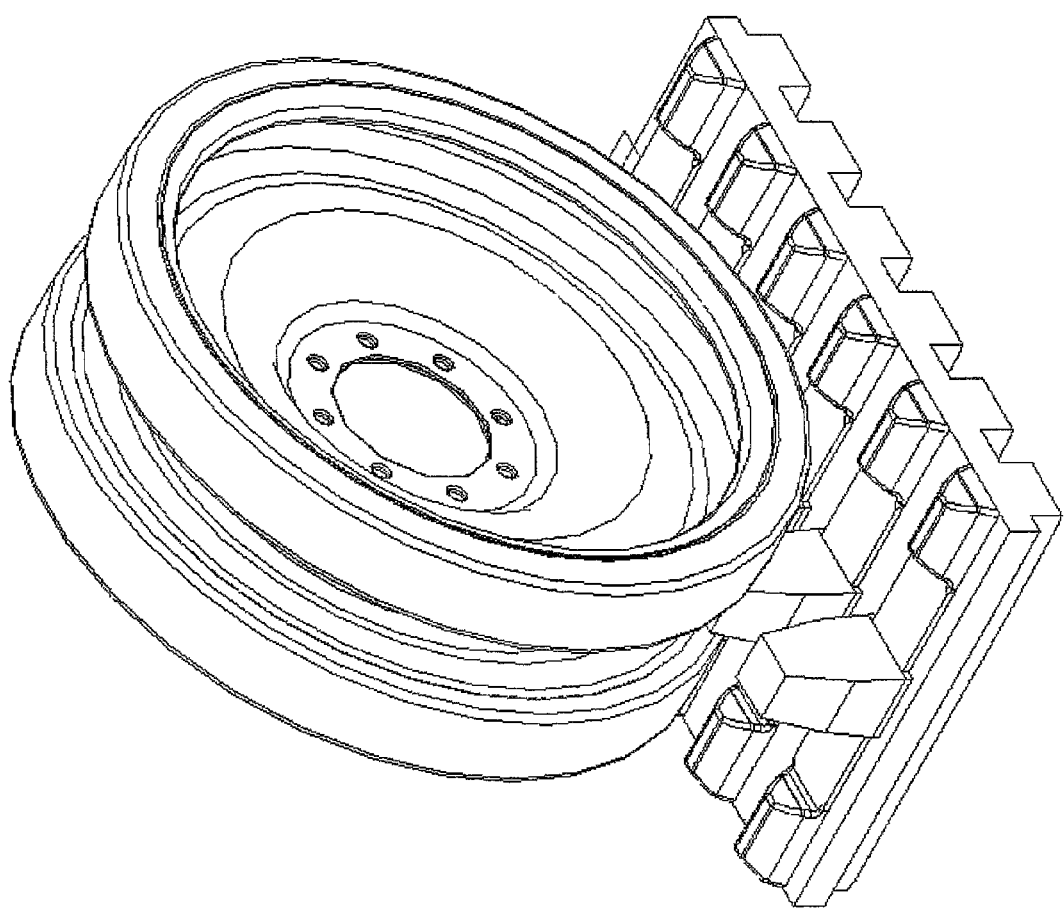
FIG. 4 is a perspective view of the track and road wheel shown in FIG. 2.

According to the present invention, in order to prevent or at least slow down the wear and/or delamination of the track 100, the space between the drives lugs 120 and the guide lug 130 are provided with projections 150 slightly raised above the inner surface of the lug area 160. However, as clearly shown in FIG. 1, the hinge areas 170 are not provided with such projections 150. Understandably, the projections 150 increase the thickness of the lug areas 160, more particularly along the wheel paths 140, thereby further protecting the reinforcing elements 180 (shown in phantom lines in FIG. 2) embedded into the track 100.

Even though these projections 150 create discontinuous or non-flat wheel paths 140 along the length of the track 100, the space 152 between two consecutives projections 150 is so chosen as to be relatively small when compared to the diameter and thus, the perimeter of the road wheels 200. This is best shown in FIGS. 5 to 7.

Figure 5:
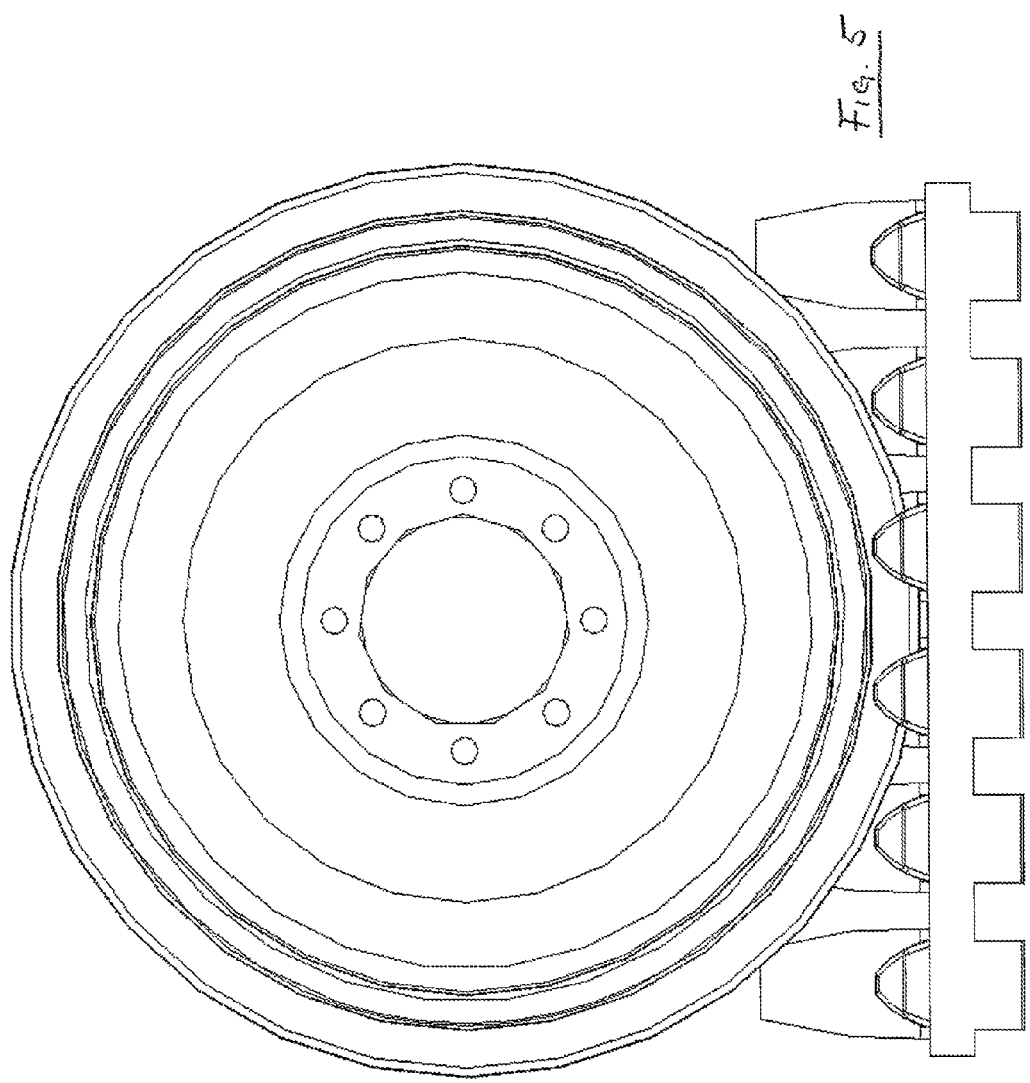
FIG. 5 is a side view of the track of FIG. 1 with a road wheel over a hinge area.
Figure 6:
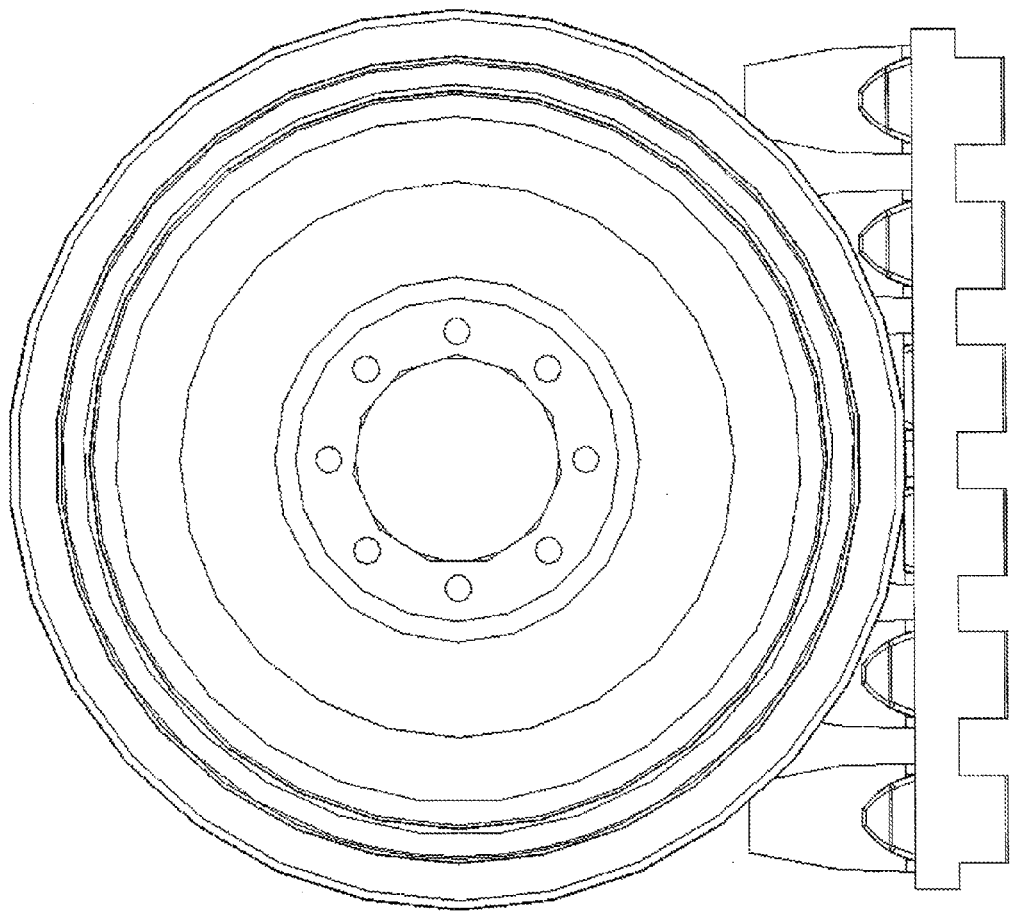
FIG. 6 is a side view of the track shown in FIG. 5 with the road wheel over a hinge area and with drive lugs removed for clarity.
Figure 7:
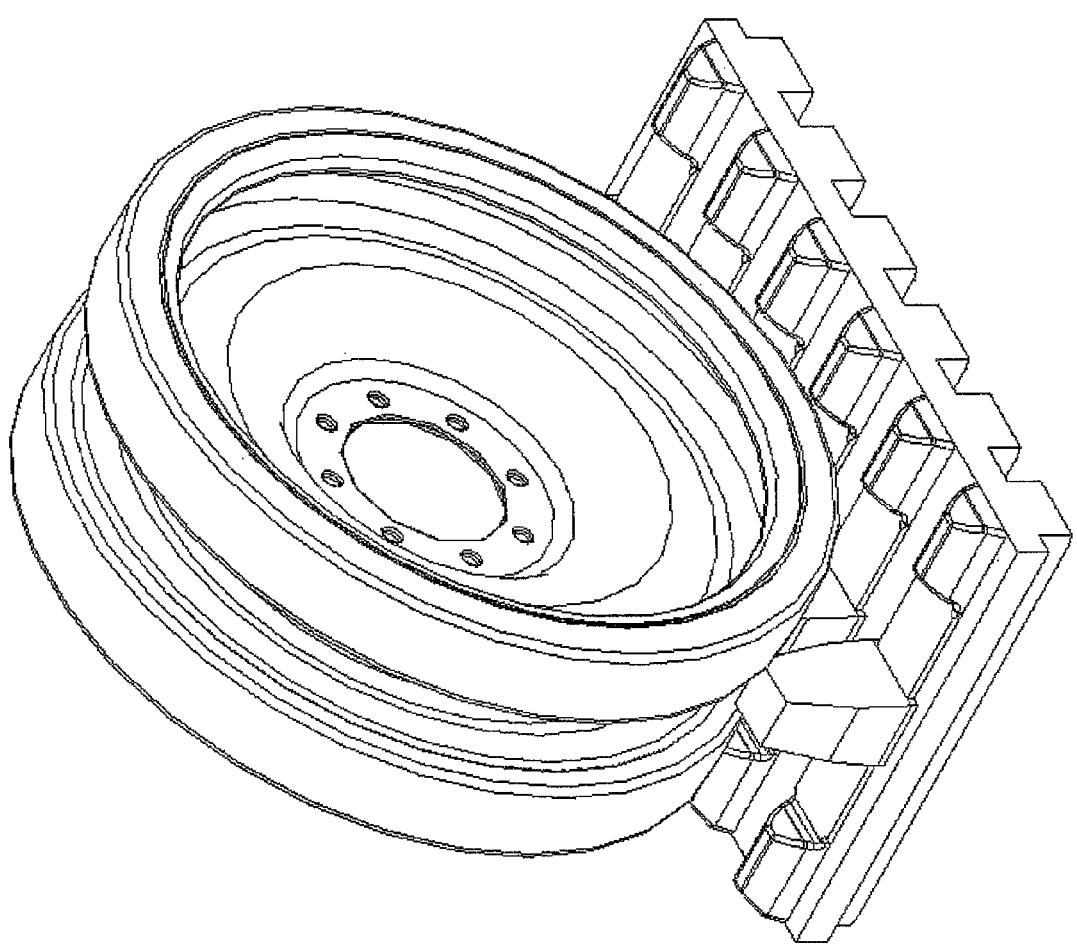
FIG. 7 is a perspective view of the track and road wheel shown in FIG. 5.

As can be seen in FIGS. 5 to 7, in the preferred embodiment, since the road wheel diameter is preferably much greater than the gap 152 between consecutives projections 150, the level of vibration of the track is not significantly increased. Still in the preferred embodiment, the gap 152 between two longitudinally consecutive projections is between 3% and 6% of the diameter of a road wheel. However, other ratios are also possible and the invention is not so limited.

Although preferred embodiments of the invention have been described in detail herein and illustrated in the accompanying figures, it is to be understood that the invention is not limited to these precise embodiments and that various changes and modifications may be effected therein without departing from the scope or spirit of the present invention.

The invention claimed is:

1. A track for use on a tracked vehicle, said track being made of polymer and adapted to travel over a sprocket wheel, a plurality of road wheels and an idler wheel, said track having an outer ground engaging surface and an inner wheel engaging surface, said track comprising a plurality of substantially non-flexible lug areas separated by flexible lug-less hinge areas, each of said lug areas comprising, on its outer surface thereof, at least one traction lug, and on its inner surface thereof, at least two drive lugs and at least one guide lug, said at least two drive lugs and said at least one guide lug being laterally spaced and defining two wheel paths, said lug areas having embedded therein reinforcing elements aligned with said drive lugs and said guide lugs, wherein said lug areas comprise projections located in said wheel paths and above said reinforcing elements such that said wheel paths are thicker along said lug areas than along said lug-less hinge areas and such that said lug-less hinge areas are substantially devoid of said projections.

2. A track as claimed in claim 1, wherein one of said two wheel paths is defined between one of said at least two drive lugs and said at least one guide lug, and wherein the other of said two wheel paths is defined between the other of said at least two drive lugs and said at least one guide lug.

3. A track as claimed in claim 2, wherein projections on consecutive lug areas define a gap, and wherein said gap is being between 3% and 6% of a diameter of said road wheels.

4. A track as claimed in claim 1, wherein projections on consecutive lug areas define a gap, and wherein said gap is being between 3% and 6% of a diameter of said road wheels.

5. A track for use on a tracked vehicle, said track being made of polymer and adapted to travel over a sprocket wheel, a plurality of road wheels and an idler wheel, said track having an outer ground engaging surface and an inner wheel engaging surface, said track comprising a plurality of substantially non-flexible lug areas separated by flexible lug-less hinge areas, each of said lug areas comprising, on its outer surface thereof, at least one traction lug, and on its inner surface thereof, two drive lugs and one guide lug laterally spaced to define two wheel paths, said lug areas having embedded therein reinforcing elements aligned with said drive lugs and said guide lugs, wherein said lug areas comprise projections located in said wheel paths and above said reinforcing elements such that said wheel paths are thicker along said lug areas than along said lug-less hinge areas and such that said lug-less hinge areas are substantially devoid of said projections.

6. A track as claimed in claim 5, wherein projections on consecutive lug areas define a gap, and wherein said gap is being between 3% and 6% of a diameter of said road wheels.

* * * * *